United States Patent
Widjaja et al.

(10) Patent No.: US 11,367,289 B1
(45) Date of Patent: Jun. 21, 2022

(54) MACHINE LEARNING-BASED FRAMEWORK FOR DRIVABLE SURFACE ANNOTATION

(71) Applicant: Motional AD LLC, Boston, MA (US)

(72) Inventors: Sergi Adipraja Widjaja, Singapore (SG); Venice Erin Baylon Liong, Singapore (SG); Zhuang Jie Chong, Singapore (SG); Apoorv Singh, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/378,636

(22) Filed: Jul. 16, 2021

(51) Int. Cl.
| | |
|---|---|
| *G06V 20/56* | (2022.01) |
| *G06N 20/20* | (2019.01) |
| *G06N 3/08* | (2006.01) |
| *G06T 7/11* | (2017.01) |
| *G06F 16/901* | (2019.01) |
| *G01C 21/00* | (2006.01) |

(52) U.S. Cl.
CPC .......... *G06V 20/56* (2022.01); *G01C 21/3811* (2020.08); *G06F 16/9027* (2019.01); *G06N 3/08* (2013.01); *G06N 20/20* (2019.01); *G06T 7/11* (2017.01); *G06T 2207/10028* (2013.01); *G06T 2207/30252* (2013.01)

(58) Field of Classification Search
CPC . G06T 2207/30252; G06T 2207/10028; G06T 7/11; G06N 3/08; G06N 20/20; G01C 21/3811; G06F 16/9027; G06K 9/00791
See application file for complete search history.

(56) References Cited

U.S. PATENT DOCUMENTS

| | | | | |
|---|---|---|---|---|
| 8,085,849 | B1 * | 12/2011 | Ratner | G06T 7/246 375/240.16 |
| 9,536,321 | B2 * | 1/2017 | Ho | G06T 7/90 |
| 10,607,342 | B2 * | 3/2020 | Zhang | G16H 50/30 |
| 11,100,335 | B2 * | 8/2021 | Winter | G06V 20/52 |
| 2010/0114537 | A1 * | 5/2010 | Pershing | G06T 11/60 703/1 |
| 2017/0076438 | A1 * | 3/2017 | Kottenstette | G06K 9/627 |
| 2017/0314954 | A1 * | 11/2017 | Golding | G01C 21/3602 |
| 2018/0198976 | A1 * | 7/2018 | Upendran | G06T 7/50 |
| 2019/0065867 | A1 * | 2/2019 | Huang | G06K 9/00805 |
| 2019/0243928 | A1 * | 8/2019 | Rejeb Sfar | G06K 9/00476 |
| 2019/0244060 | A1 * | 8/2019 | Dundar | G06N 3/08 |
| 2019/0251369 | A1 * | 8/2019 | Popov | G06T 5/20 |
| 2019/0355103 | A1 * | 11/2019 | Baek | G06T 5/005 |
| 2020/0143250 | A1 * | 5/2020 | Lee | G06N 3/04 |
| 2020/0160149 | A1 * | 5/2020 | Morita | G06N 3/0445 |
| 2020/0278408 | A1 * | 9/2020 | Sung | G06T 7/0012 |

(Continued)

OTHER PUBLICATIONS

[No Author Listed], "SAE: Stuface Vehicle Recommended Practice, Taxonomy and Definitions for Terms Related to Driving Automation Systems for On-Road Motor Vehicles," SAE International, Sep. 30, 2016, 30 pages.

*Primary Examiner* — Mia M Thomas
(74) *Attorney, Agent, or Firm* — Fish & Richardson P.C.

(57) ABSTRACT

Enclosed are embodiments of an ML-based framework for drivable surface annotation. In an embodiment, a method comprises: obtaining, using at least one processor, multi-modal map data for a geographic region; and automatically annotating, using the at least one processor, one or more semantic masks of the map data using a machine learning model.

20 Claims, 13 Drawing Sheets

(56) References Cited

U.S. PATENT DOCUMENTS

| | | | | |
|---|---|---|---|---|
| 2020/0327701 A1* | 10/2020 | Zhou | ......................... | G06N 3/08 |
| 2021/0046861 A1* | 2/2021 | Li | ............................. | G06T 7/11 |
| 2021/0073449 A1* | 3/2021 | Segev | .................... | G06N 5/025 |
| 2021/0073953 A1* | 3/2021 | Lee | ....................... | G06N 3/0454 |
| 2021/0097691 A1* | 4/2021 | Liu | ....................... | G06N 3/0454 |
| 2021/0125583 A1* | 4/2021 | Kaplanyan | ............. | G06N 3/088 |
| 2021/0142497 A1* | 5/2021 | Pugh | ....................... | G06T 7/194 |
| 2021/0199446 A1* | 7/2021 | Marschner | ............. | G01C 21/32 |
| 2021/0201050 A1* | 7/2021 | Marschner | ........... | G06V 30/274 |
| 2021/0201569 A1* | 7/2021 | Marschner | ............. | G01S 17/89 |
| 2021/0241500 A1* | 8/2021 | Chen | ....................... | G06N 20/00 |
| 2021/0243362 A1* | 8/2021 | Castillo | .................... | G06T 7/12 |
| 2021/0319539 A1* | 10/2021 | Agarwal | ................ | G06T 7/194 |
| 2021/0401392 A1* | 12/2021 | Bengtsson | ............. | G16H 50/20 |

\* cited by examiner

FIG. 4

MACHINE LEARNING-BASED FRAMEWORK FOR DRIVABLE SURFACE ANNOTATION

FIELD OF THE INVENTION

The description that follows relates generally to annotating semantic map layers for traversing roads using an autonomous vehicle.

BACKGROUND

Autonomous vehicles often use a perception stack that operates on sensor data, such as image data (e.g., camera data) and depth data (e.g., LiDAR point clouds), to perform object detection using trained machine learning (ML) models. The ML models typically output two-dimensional (2D) and/or three-dimensional (3D) bounding boxes containing objects that have been labeled using the ML models. The labeled object detections are used by the vehicle with hand-annotated semantic map layers (e.g., lane and intersection mask layers) to traverse roads in the environment safely and efficiently. The semantic map layers include coarse-grained information, such as road markings defining drivable surfaces, and finer-grained information such as pedestrian crossings and vehicle park areas. Annotating the semantic map layers by hand is labor intensive and a drain on financial resources.

SUMMARY

Techniques are provided for ML-based framework for drivable surface annotation.

In an embodiment, a method comprises: obtaining, using at least one processor, map data for a geographic region; and automatically annotating, using the at least one processor, one or more semantic masks of the map data using a machine learning model.

In an embodiment, the map data is multimodal.

In an embodiment, the multimodal map data includes at least a intensity and occupancy maps.

In an embodiment, the machine learning model is implemented by a two-dimensional (2D) convolutional network.

In an embodiment, the machine learning model is implemented using ensemble modeling.

In an embodiment, the machine learning model is iteratively trained on image samples extracted from one or more map models, and different image samples are extracted for each training iteration to increase variability of training images.

In an embodiment, the one or more map models are split into different sampling image regions for generating training and testing datasets for training and testing the machine learning model.

In an embodiment, the one or more map models are automatically split into different sampling image regions for generating training and testing datasets using a tree data structure.

In an embodiment, the tree data structure is a Quadtree data structure.

In an embodiment a system comprises: at least one processor; and memory storing instructions thereon that, when executed by the at least one processor, cause the at least one processor to perform any of the methods described above.

In an embodiment, a non-transitory, computer-readable storage medium comprises: at least one processor; and memory storing instructions thereon that, when executed by the at least one processor, cause the at least one processor to perform any of the methods described above.

One or more of the disclosed embodiments provide one or more of the following advantages. The number of hours needed to hand-annotate semantic map layers is reduced allowing financial and human resources to be redirected from hand-annotating high-definition (HD) maps. The drivable surface masks output by the disclosed embodiments can be used as semantic priors for other machine learning applications, to inform future taxonomies and active learning for data curation (e.g., biasing data mining on areas that are drivable, identify intersections on untraversed road for improved data mining) and to reduce compute requirements by excluding points that are too far from a drivable surface. With the ML-based framework more information can be exploited from existing map resources, thus boosting performance on, for example, road boundaries and intersections.

These and other aspects, features, and implementations can be expressed as methods, apparatus, systems, components, program products, means or steps for performing a function, and in other ways. These and other aspects, features, and implementations will become apparent from the following descriptions, including the claims.

BRIEF DESCRIPTION OF THE DRAWINGS

FIG. 4 illustrates an example architecture for an AV, in accordance with one or more embodiments.

DETAILED DESCRIPTION

Figure 1:
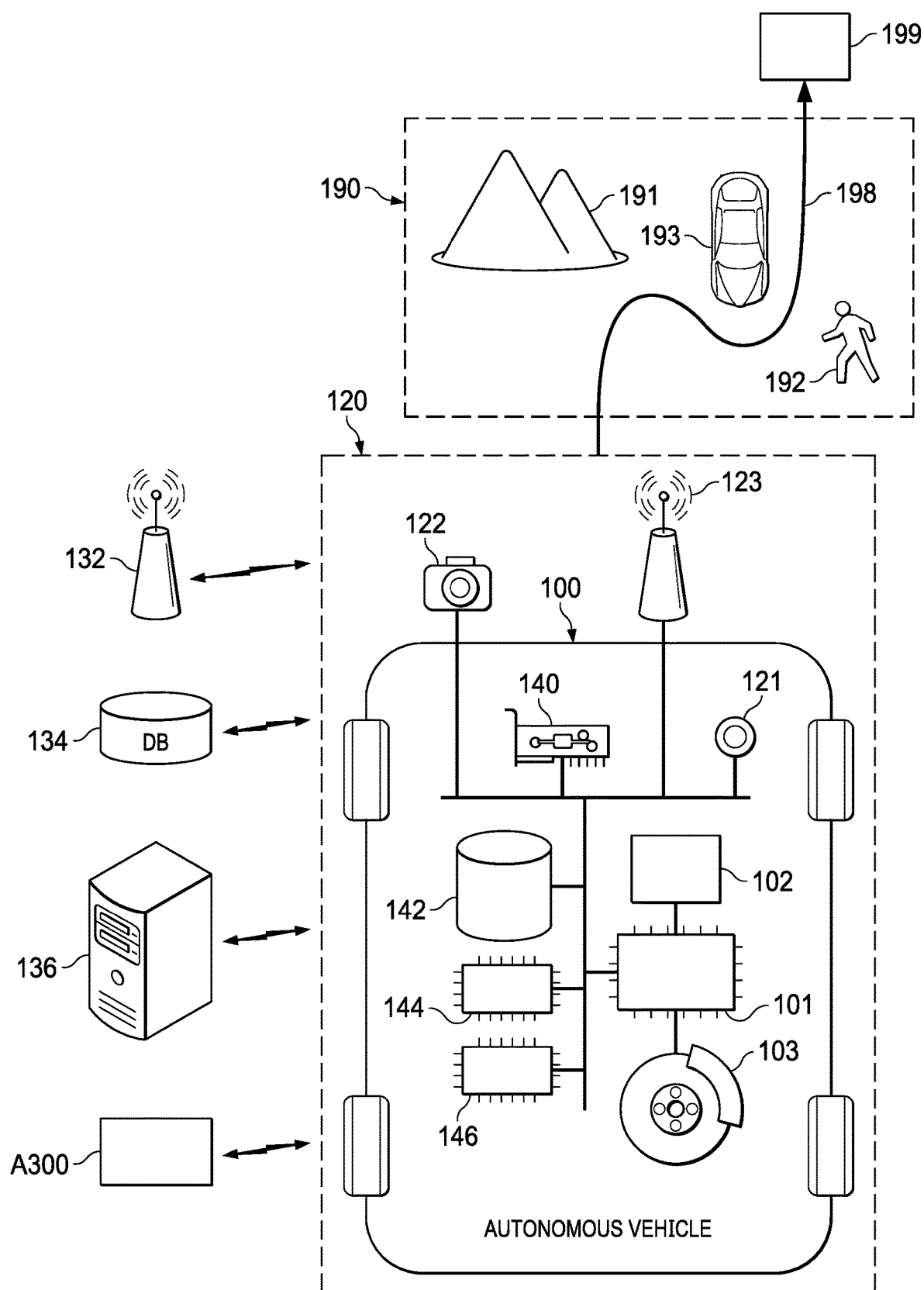
FIG. 1 illustrates an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, systems, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
 1. General Overview
 2. System Overview
 3. Autonomous Vehicle Architecture
 4. ML-Based Framework for Drivable Surface Annotation

General Overview

Techniques are provided for an ML-based framework for drivable surface annotation. In an embodiment, ML-based techniques are applied to map models. The map models can be localized to specific regions of a map. The map models can be high-definition maps and include but are not limited to: intensity maps (e.g., maps provided by LiDAR sensors that measure, for every point in a point cloud, a return strength of a laser pulse that generated the point), occupancy maps (representing areas occupied by an object), color maps (e.g., color coded camera images), texture maps (representing textures), maps output from other ML models and/or the like (e.g., predicted BEV maps), colored pointclouds and outputs from real time models running on the mounted sensor suite.

The ML-based techniques automatically predict a drivable surface mask (e.g., a mask of a region of a map where at least one vehicle is intended to operate) with semantic layers associated with the drivable surface mask annotated with additional categories/labels (e.g., lanes, intersections, pedestrians, walkways, vehicle parking lots). In an embodiment, the ML-based techniques are implemented using a two-dimensional (2D) convolutional network 2D convolutional network with hand-annotated semantic layers as target labels. In an embodiment, samples of image regions of interest are extracted from the map models and input into the 2D convolutional network which predicts the semantic map layers with additional categories/labels, which can be further hand-annotated.

In an embodiment, the 2D convolutional network is a modified U-Net model where the basic convolutional blocks in the contraction and/or expansion paths of the U-Net model are replaced with residual blocks and/or dense blocks based on ResNet and DenseNet ML models. In an embodiment, a loss function that is combination of cross entropy and dice loss can be used to train the 2D convolutional network.

In an embodiment, ensemble modeling can be used with a variety of different models in the contraction and/or expansion paths of the 2D convolutional network to improve prediction. In an embodiment, the samples are extracted from image regions online during training to improve efficiency. A tree data structure (e.g., Quadtree) can be used to split image regions to ensure an equal proportion of road markings in 2D convolutional network training and testing datasets.

The disclosed embodiments provide one or more of the following advantages. By using ML models to assist the hand-annotation process the amount of annotations needed by an individual to completely annotate an HD map can be reduced, thereby increasing the speed of annotation overall. The output of the 2D convolutional network is an annotated drivable surface mask that can be used by a planner of an AV or as semantic priors for other ML models, such as image segmentation and point cloud segmentation networks used in perception tasks implemented by AV stacks. The concept of "drivability" may also be used to inform future taxonomies and active learning for data curation. For example, potential applications include but are not limited to: biasing data mining on drivable surfaces and identifying intersections on untraversed roads for better data mining. To reduce compute requirements by a point cloud (e.g., LiDAR point cloud) segmentation network, the drivable surface mask can be used to exclude points from the point cloud that are too far from the drivable surface.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, motorcycles, bicycles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

As used herein, "ego vehicle" or "ego" refers to a virtual vehicle or AV with virtual sensors for sensing a virtual environment that is utilized by, for example, a planner to plan the route of the virtual AV in the virtual environment.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are a Global Navigation Satellite System (GNSS) receiver, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
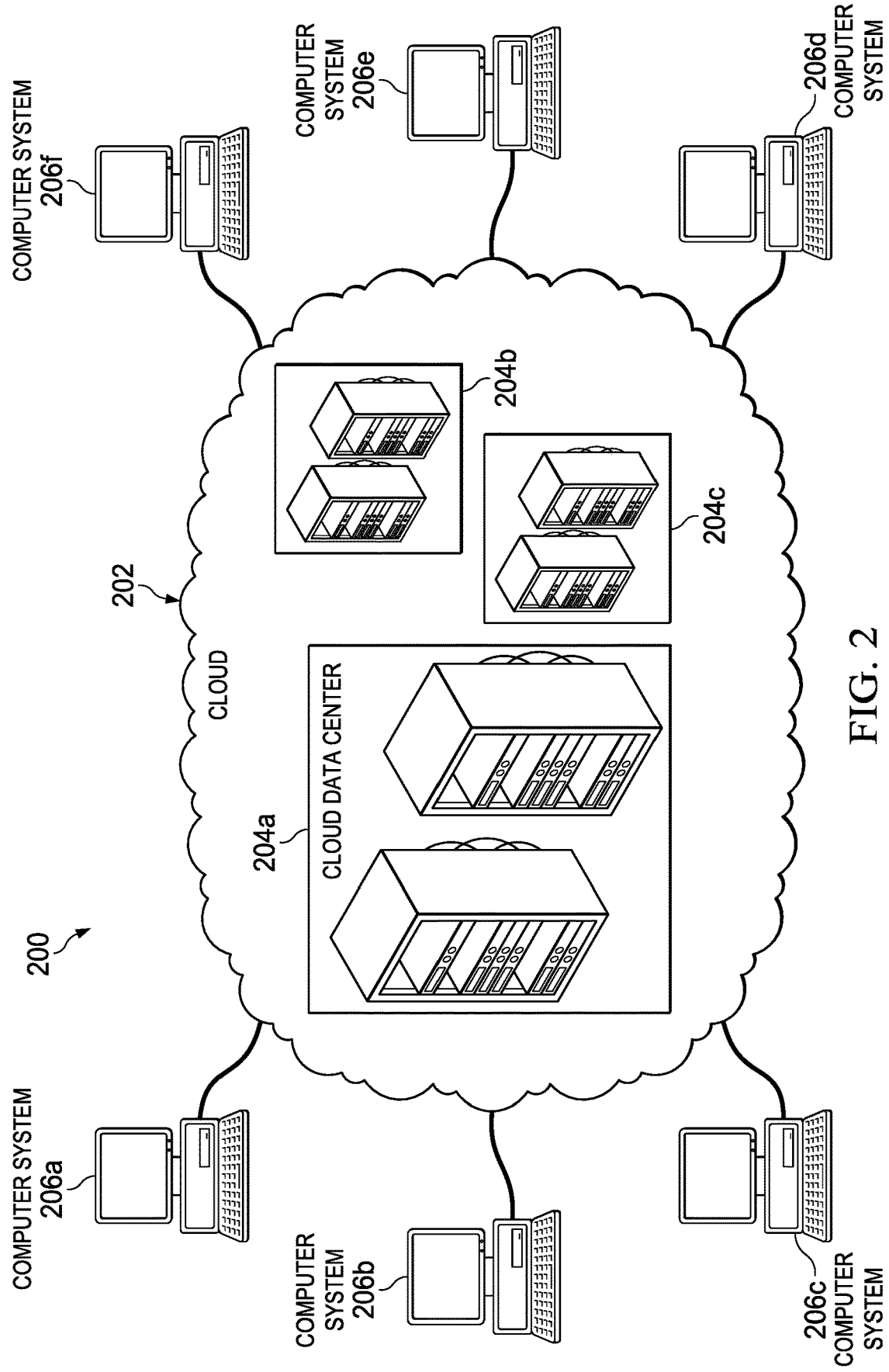
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
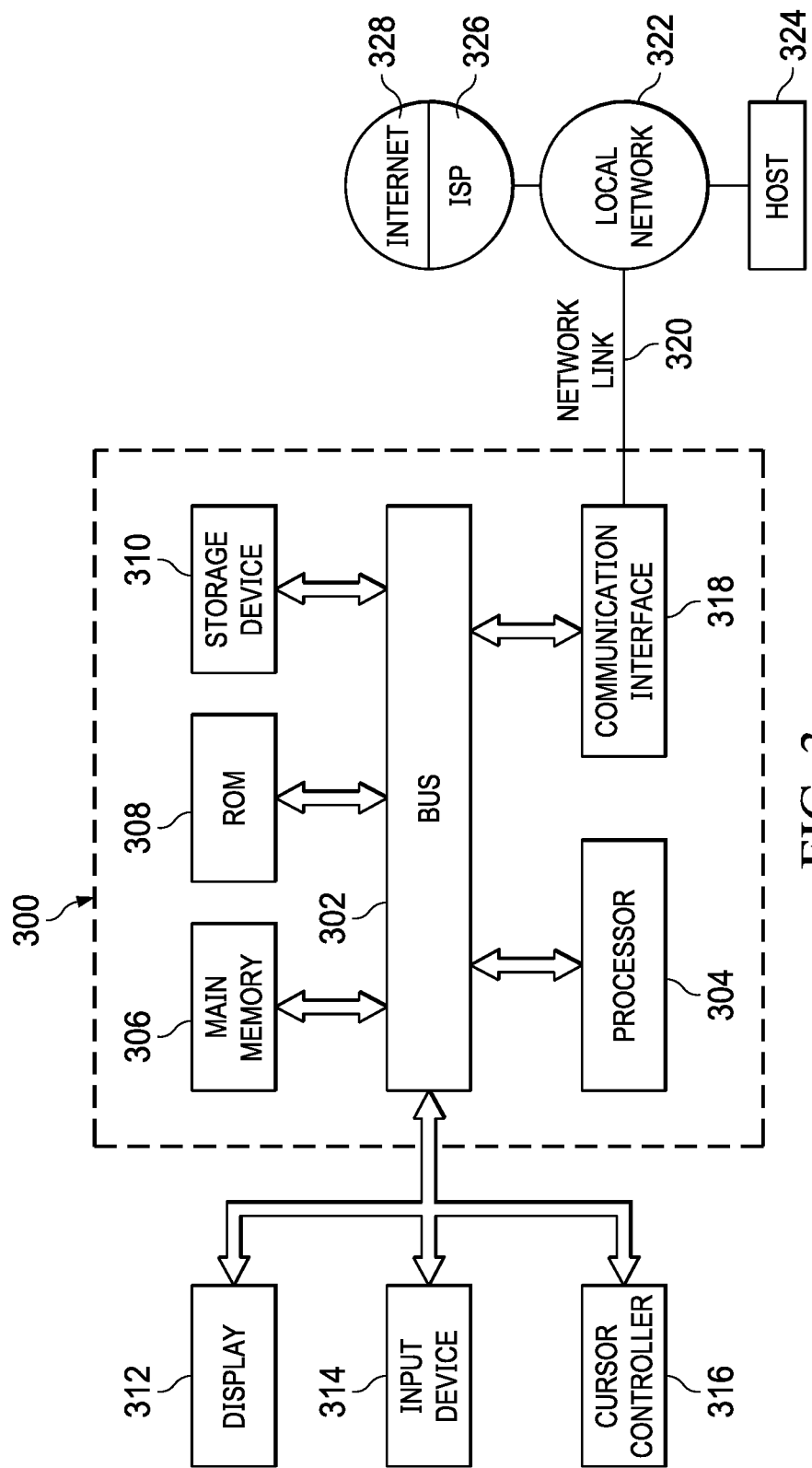
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
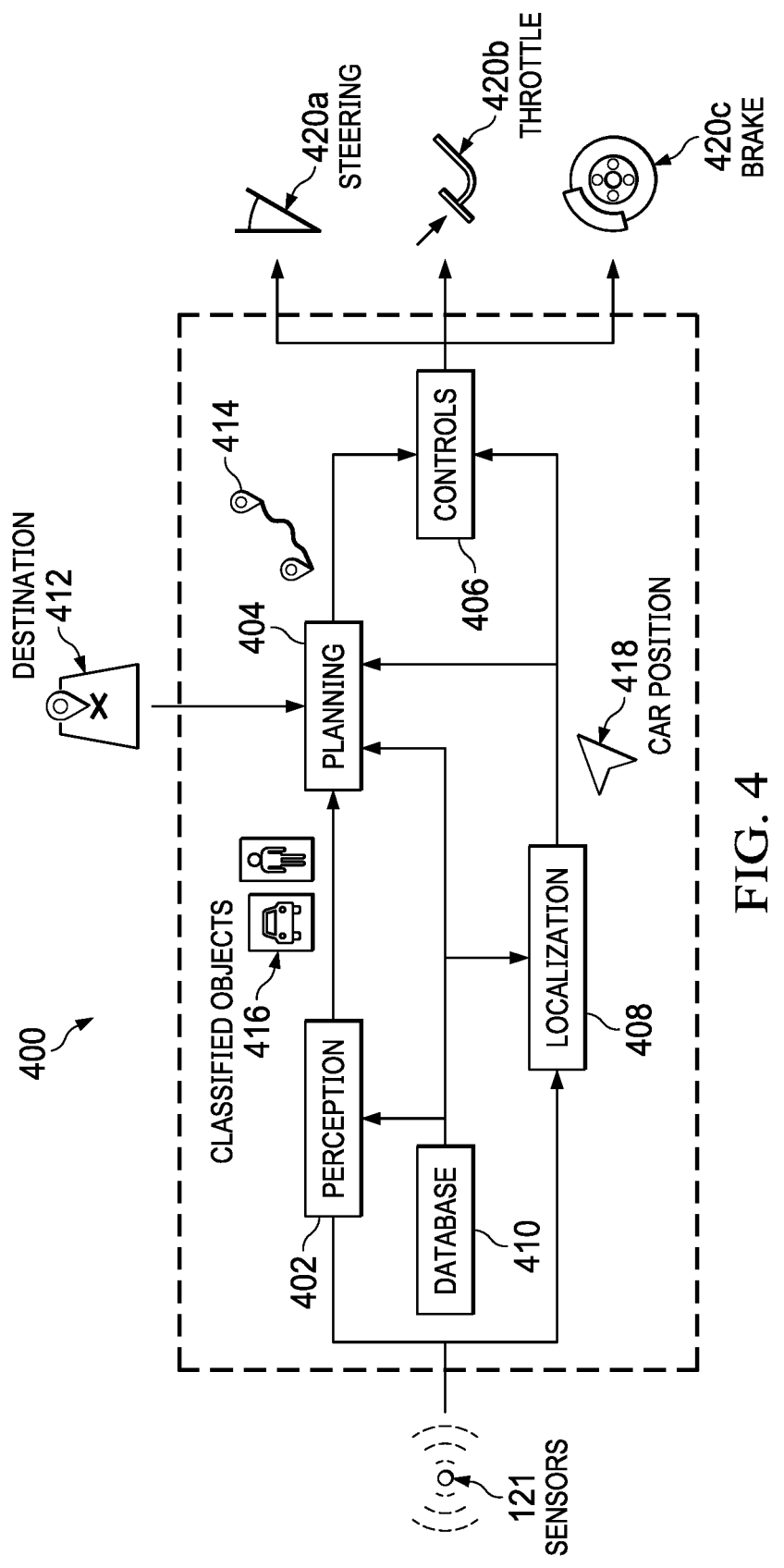

FIG. 4 shows an example architecture 400 for an autonomous vehicle (e.g., the AV 100 shown in FIG. 1). The architecture 400 includes a perception system 402 (sometimes referred to as a perception circuit), a planning system 404 (sometimes referred to as a planning circuit), a control system 406 (sometimes referred to as a control circuit), a localization system 408 (sometimes referred to as a localization circuit), and a database system 410 (sometimes referred to as a database circuit). Each system plays a role in the operation of the AV 100. Together, the systems 402, 404, 406, 408, and 410 may be part of the AV system 120 shown in FIG. 1. In some embodiments, any of the systems 402, 404, 406, 408, and 410 is a combination of computer software (e.g., executable code stored on a computer-readable medium) and computer hardware (e.g., one or more microprocessors, microcontrollers, application-specific integrated circuits (ASICs)), hardware memory devices, other types of integrated circuits, other types of computer hardware, or a combination of any or all of these things).

In use, the planning system 404 receives data representing a destination 412 and determines data representing a trajectory 414 (sometimes referred to as a route) that can be traveled by the AV 100 to reach (e.g., arrive at) the destination 412. In order for the planning system 404 to determine the data representing the trajectory 414, the planning system 404 receives data from the perception system 402, the localization system 408, and the database system 410.

The perception system 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning system 404.

The planning system 404 also receives data representing the AV position 418 from the localization system 408. The localization system 408 determines the AV position by using data from the sensors 121 and data from the database system 410 (e.g., a geographic data) to calculate a position. For example, the localization system 408 uses data from a GNSS receiver and geographic data to calculate a longitude and latitude of the AV. In an embodiment, data used by the localization system 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. Typically, the high-precision maps are hand-annotated, which is a labor intensive process. To reduce the amount of labor the maps can be annotated using an ML-based framework, as described in reference to FIG. 5.

The control system 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control system 406 will operate the control functions 420a-c in a manner such that the steering angle of the steering function will cause the AV 100 to turn left and the throttling and braking will cause the AV 100 to pause and wait for passing pedestrians or vehicles before the turn is made.

ML Based Framework for Drivable Surface Annotation

Figure 5:
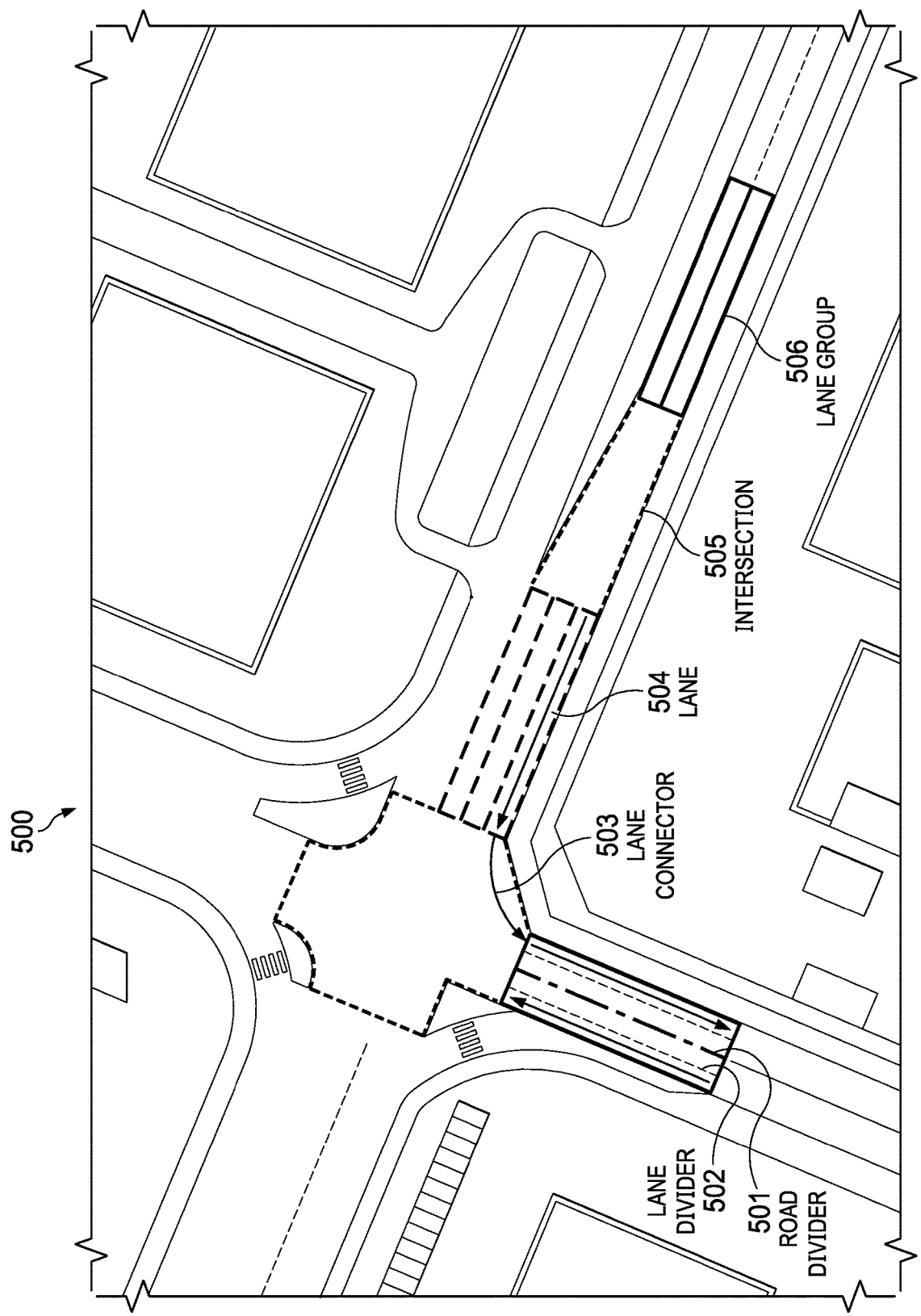
FIG. 5 is an example bird's eye view (BEV) of a hand-annotated semantic map layer, in accordance with one or more embodiments.

FIG. 5 is an example bird's eye view (BEV) of hand-annotated semantic map layers of an image region 500, in accordance with one or more embodiments.

On top of semantic information (e.g., information about surfaces of at least one object in an environment and/or the like) generated from a perception system (e.g., perception system 402), the AV 100 relies on hand-annotated semantic layers to traverse roads safely and efficiently. The semantic map layers include may layers associated with road markings representing coarse-grained information (e.g., drivable areas) and/or fine-grained information (e.g., pedestrian crossings, walkways, vehicle parking areas). In the example shown, hand annotations are shown for a road divider 501, lane divider 502, lane connector 503, lanes 504, intersection 505 and lane group 506.

Hand-annotation of a high-definition (HD) map layer, such as the map shown in FIG. 5, requires a significant amount of hours spent by an individual and financial resources. For example, using hand-annotation only, a few miles per week can be annotated depending on the number of annotators available. As described in further detail below, an ML-based solution is described that utilizes an image segmentation network (2D convolutional network) and pre-existing hand-annotated semantic layers to train a ML model (or network of ML models) to generate predictions about semantic layers (e.g., the association of objects and/or other objects) corresponding to an HD map. The HD map can then be annotated by human annotators based on (e.g., after) the ML model or network of ML models generating the predictions about the semantic layers. By using ML models to assist the hand-annotation process the amount of annotations needed by an individual to completely annotate an HD map can be reduced, thereby increasing the speed of annotation overall.

Figure 6:
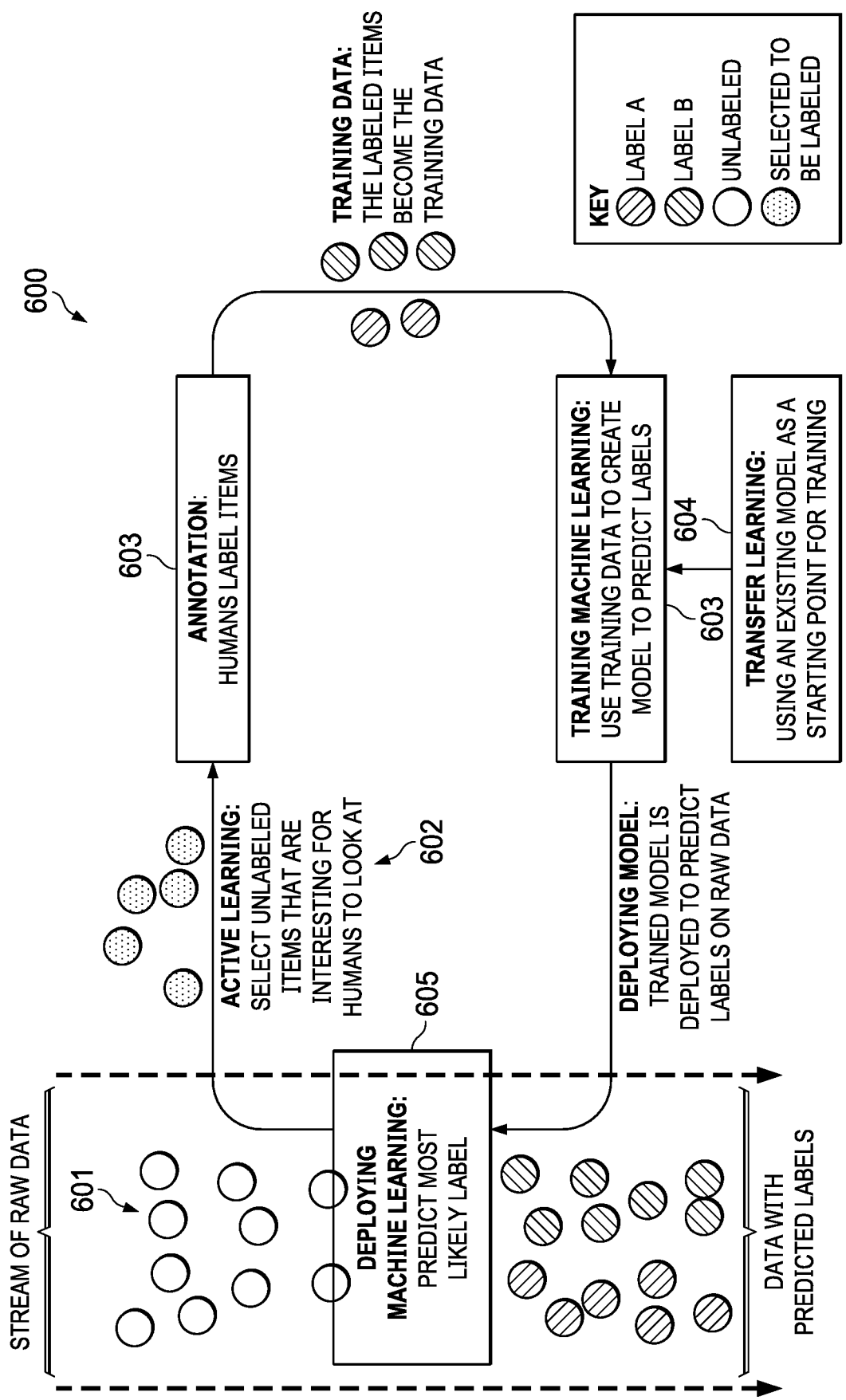
FIG. 6 is a conceptual diagram illustrates an ML-assisted annotation cycle, in accordance with one or more embodiments.

FIG. 6 is a conceptual diagram illustrating an ML-assisted annotation cycle 600 for annotating semantic map layers, in accordance with one or more embodiments. In embodiment, active learning 602 (or other automatic training data selection process) is used to select unlabeled objects of interest 601 from raw sensor data (e.g., LiDAR point clouds, camera images). The unlabeled objects of interest 601 are hand-annotated 603 (labeled) by human annotators and used as training data to train a ML model 604 to predict labels for the objects of interest. In this example, there are two labels: Label A and Label B. The trained ML model 604 is then deployed 605 into the ML-assisted annotation cycle for use in predicting labels for objects of interest 601 from the raw sensor data, thus completing the ML-assisted annotation cycle 600. In an embodiment, an existing ML model can be used as a starting point for training (e.g., transfer learning 606).

Figure 7A:
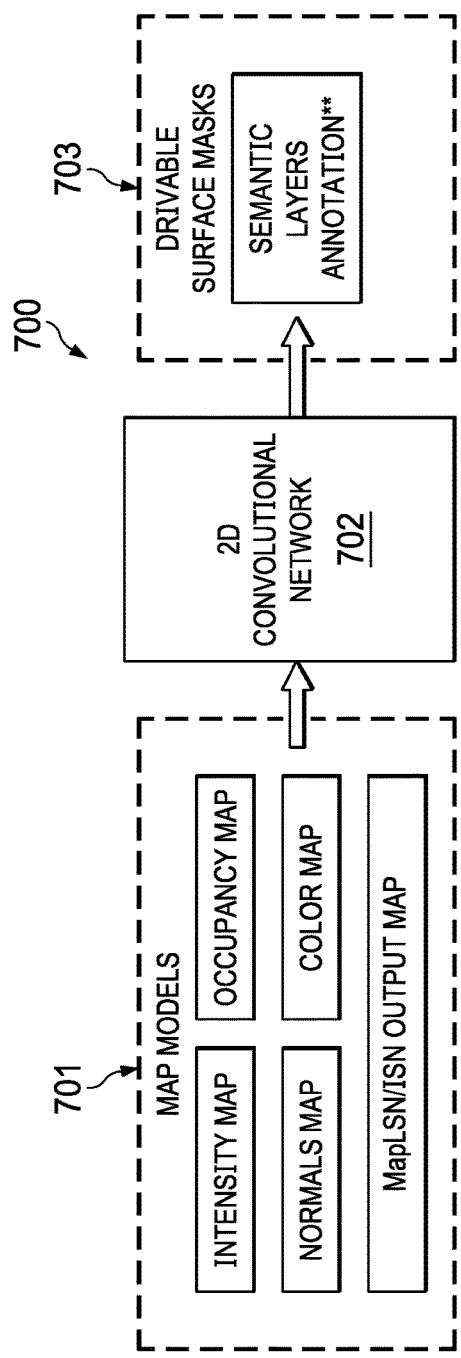
FIGS. 7A and 7B are conceptual diagrams illustrating an ML-based framework for drivable surface annotation, in accordance with one or more embodiments.
Figure 7B:
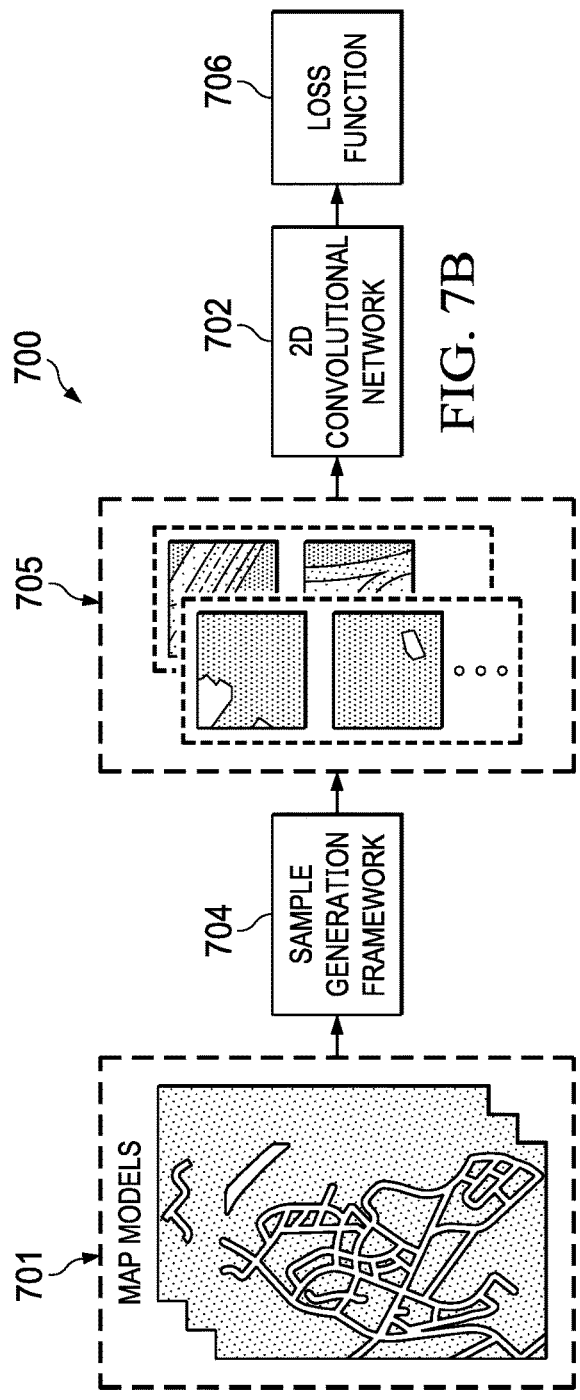

FIGS. 7A and 7B are conceptual diagrams illustrating an ML-based framework 700 for drivable surface annotation, in accordance with one or more embodiments. The ML-based framework 700 uses ML on accurately localized, multi-modal HD-map models 701. Some examples of HD-map map models 701 include but are not limited to: intensity maps, occupancy maps, texture maps (normals map), color maps and the predicted output maps of a LiDAR segmentation network (LSN) and/or 2D convolutional network which is trained using camera images from one or more cameras mounted on the vehicle. These multimodal HD-map models 701 are input into image segmentation network 702. In an embodiment, network 702 is a deep-learning-based model trained to predict drivable surface masks with additional category/label information (e.g., lanes, intersections, pedestrians, walkways, vehicle parking areas). In some implementations, the HD-map models 701 are generated using a simultaneous localization and mapping (SLAM) engine.

Color Map

In an embodiment, AV 100 is equipped with cameras that can capture a different dynamic of the environment. For every object/point/landmark that is captured by the LiDAR, there is a mapping between that object/point/landmark to a point on the camera sensor. Thus, color information for that point can be obtained by cross referencing the color pixel value obtained from the camera sensor to the LIDAR point. A birds eye view raster embedding of the scanned colored pointcloud can then be generated, i.e., referred to as a "color map" above.

Normals Map

In normals map captures an orientation of a plane that a point is associated with (either x, y, or z direction). In an embodiment, neighboring points are used to approximate the orientation of the plane.

Segmentation Raster Obtained From Real Time System

In an embodiment, the same logic that applies to the camera system can apply to a segmentation raster obtained from a real time system, where there is a correspondence between the camera pixels with the LiDAR points. In this case, the color information is replaced by semantic labels that are obtained from a real time system, such as an image segmentation network. The semantic labels are mapped back to the LiDAR scan, and a birds eye view of the lidar scan is rasterized.

In an embodiment, sample generation framework 704 extracts samples 705 (also referred to as "patches") from a plurality of different HD-map models 701 to be used as training data for 2D convolutional network 702. The samples 705 can be extracted on demand during training by online data loaders that access (e.g., subscribe) directly to the HD-map model data (e.g., binary data), which are scalable for different versions of the HD-map models. By allowing the online data loaders to access/subscribe directly to the HD-map models during training, less steps are needed for dataset preparation than if the samples were extracted offline. Moreover, different samples can be extracted every training iteration to increase the variability of the training images.

As stated above, the extracted samples are input into 2D convolutional network 702 for predicting an annotated drivable surface with additional categories/labels of information, such as lanes, intersections, vehicle parks, pedestrian crossings, walkways, etc. 2D convolutional network 702 can be trained using any desirable loss function 706. In an embodiment, 2D convolutional network 702 is implemented using a modified U-Net model and the loss function 706 is a combination of cross entropy and dice loss. The training of 2D convolutional network 702 can be performed by comparing the output of 2D convolutional network 702 to the groundtruth annotation layers by computing a loss using a loss function 706, and updating parameters (e.g. weights and biases) of 2D convolutional network 702 based on the loss using neural network backpropagation techniques.

In an embodiment, for each HD-map model 701, a map region in the HD-map model 701 is split into different sampling image regions for generating training and testing datasets for 2D convolutional network 702. To increase the variability of the training data, samples are randomly extracted from the sampling regions online during training by sample generation framework 704. To ensure an equal proportion of semantic map layers (e.g., road markings) between the training and testing datasets, the splitting of the HD-map models 701 into training and testing datasets is automated using a tree data structure or other suitable data structure.

In an embodiment, a Quadtree algorithm is used to efficiently store the locations of road landmarks in an image region. Each node of the Quadtree has at most four children. The Quadtree algorithm is implemented over the image region where the splitting criterion for child nodes is met when an instance of a particular road landmark is present more than once. In an embodiment, the Quadtree algorithm can be implemented on each two-dimensional (2D) image region as follows: 1) divide the 2D image region into four boxes; 2) if a box contains one or more road landmarks, create a child node for the box and store it in the 2D space of the box; 3) if a box does not contain any road landmarks, do not create a child node for the box; and 4) recurse for each of the child nodes. In an embodiment, the number of intersections can be used as the splitting criterion. However, any suitable splitting criterion can also be used, such as random patch sampling based on an aggregate area of drivable surface using a probability heatmap.

In an embodiment, 2D convolutional network 702 is implemented using a modified U-Net model. The U-Net model is described in, for example, "Long, J.; Shelhamer, E.; Darrell, T. (2014). "Fully convolutional networks for semantic segmentation." *IEEE Transactions on Pattern Analysis and Machine Intelligence*. 39 (4): 640-651. arXiv: 1411.4038, which is incorporated by reference herein in its entirety. U-Net comprises a contracting path and an expansive path. The contracting path is a conventional convolutional neural network (CNN) that includes repeated application of convolutions using basic convolutional blocks, each followed by a rectified linear unit (ReLU) and a max pooling operation. In the contraction path, spatial information is reduced while feature information is increased. In the expansive path, the feature and spatial information are combined through a sequence of up-convolutions and concatenations with high-resolution features from the contracting path.

In an embodiment, the conventional U-Net model is modified by replacing the basic convolutional blocks of the U-Net model with residual blocks inspired by ResNet architectures, as described in, for example, in He, Kaiming; Zhang, Xiangyu; Ren, Shaoqing; Sun, Jian (2016). "Deep Residual Learning for Image Recognition." Proc. Computer Vision and Pattern Recognition (CVPR), IEEE, which is incorporated by reference herein in its entirety.

In another embodiment, the conventional U-Net model is modified by replacing the basic convolutional blocks of the U-Net model with dense blocks inspired by DenseNet architectures, as described in, for example, Gao Huang; Zhuang Liu; Laurens van der Maaten; Kilian Q. Weinberger. "Densely Connected Convolutional Networks." arXiv: 1608.06993 [cs.CV], which is incorporated by reference herein in its entirety.

The features that are obtained from the contractive path are reused in the expansive path of the U-Net. The expansive path contains basic convolutional blocks that retain the same output dimension while decreasing the number of channels, accompanied by upsampling blocks in between which achieves an increased feature map spatial dimension and a decreased number of channels.

Figure 8:
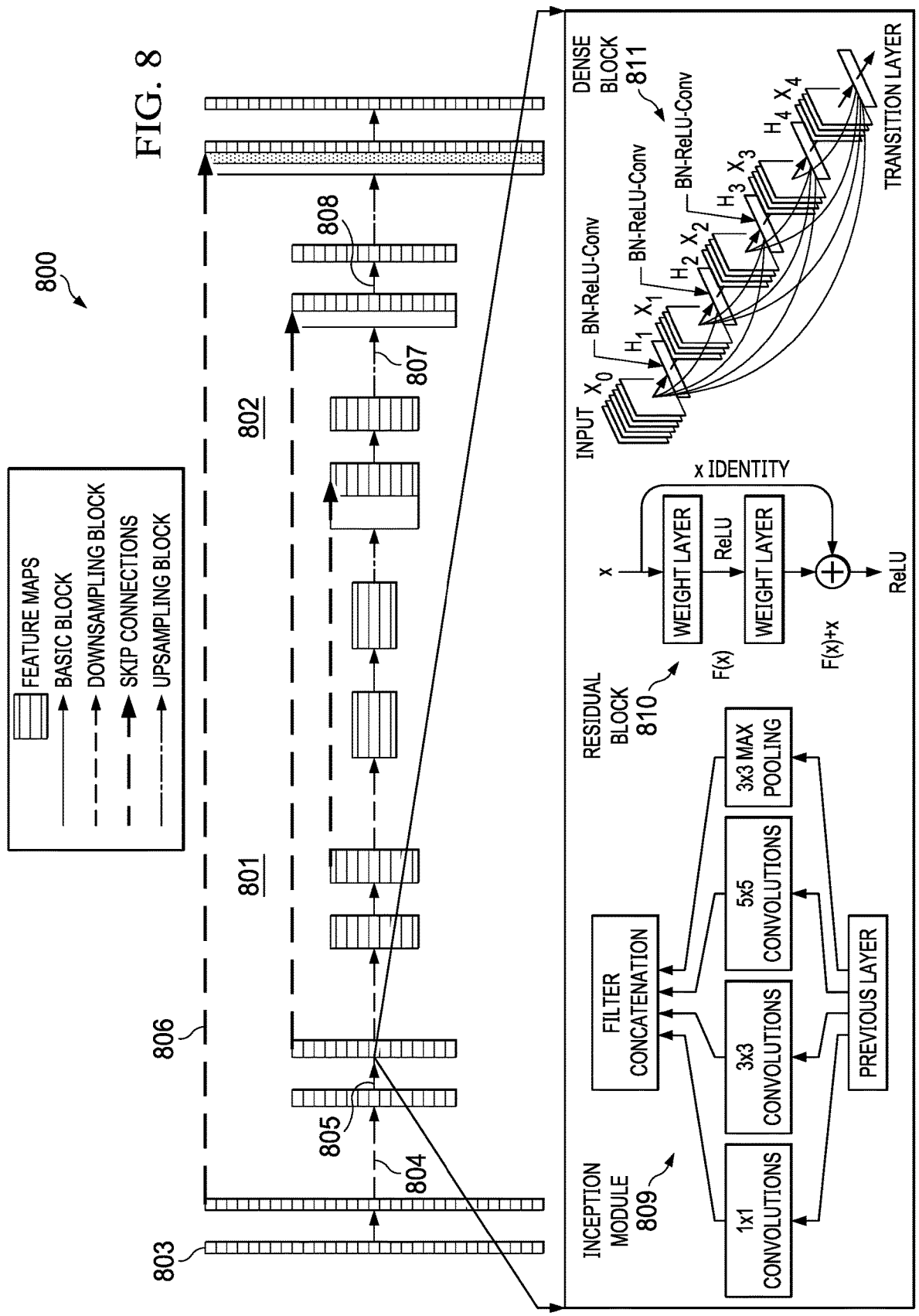
FIG. 8 is a conceptual diagram of a neural network for ML-based semantic map layer annotation, in accordance with one or more embodiments.

FIG. 8 is a conceptual diagram of a modified 2D convolutional network 800 where the basic convolutional blocks of a U-Net ML model are replaced with residual blocks and/or dense block, in accordance with one or more embodiments. In an embodiment, modified 2D convolutional network 800 includes contraction path 801 and expansion path 802. Blocks 803 represent feature maps, lines 805 represent basic convolutional blocks to be replaced by one or more of an inception system 809, residual blocks 810 or dense blocks 811, lines 804 represent downsampling blocks, lines 807 represent upsampling blocks and lines 806 represent skip connections. Note for clarity on a single instance of the feature maps, basic blocks, downsampling blocks, skip connections and upsampling blocks are labeled with numerical designators. The provided legend also shows the locations of each instance of these blocks in the modified 2D convolutional network 800.

In an embodiment, inception system 809 includes multiple processing paths that are feed from a previous layer. The output of each path feed is concatenated using a concatenation filter. In the example shown, a first processing path includes a 1×1 convolutional block, a second processing path includes a 1×1 convolution block followed by 3×3 convolution block and third processing path includes a 1×1 convolution block followed by 5×5 convolutional block and a fourth processing path includes a 3×3 convolution block followed by a 1×1 convolutional block.

Most state-of-the-art image recognition backbones follow a certain pattern, where an alternating downsampling convolution and basic convolution operation is applied to the image and the corresponding feature maps. The basic convolutional blocks 805 retain the same dimension of the feature maps 803 throughout. The downsampling convolution in the contraction path 801 achieves a reduced feature map spatial dimension and an increased number of channels. The product of these operations is a number of feature maps 803 over differing strides that is the output of the skip connections 806. The implication of this is that most backbones are readily usable for the contractive path of the U-Net model. Accordingly, by viewing the U-Net model as a sequence of blocks, residual blocks 810 from ResNet ML models or dense blocks 811 from DenseNet ML models can replace the basic convolutional blocks 805 of U-Net model 800, as shown in FIG. 8.

Figure 9:
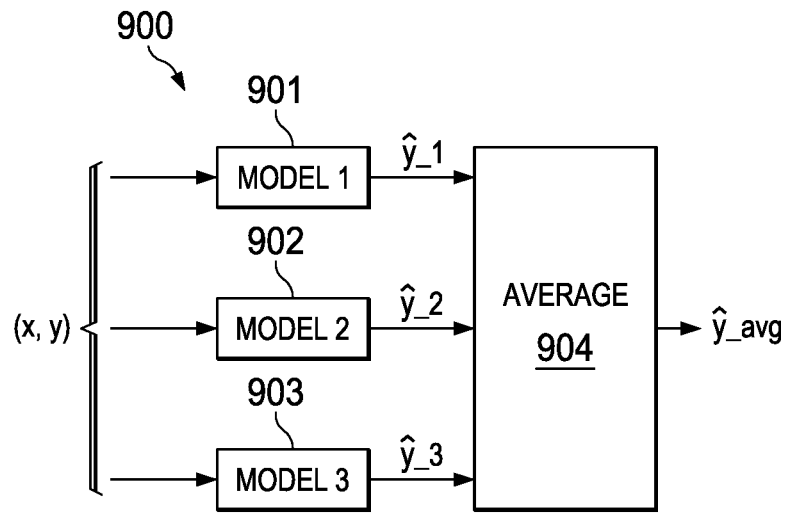
FIG. 9 is a conceptual diagram illustrating ensemble modeling for ML-based semantic map layer annotation, in accordance with one or more embodiments.

FIG. 9 is a conceptual diagram illustrating ensemble modeling 900 for ML-based semantic map layer annotation, in accordance with one or more embodiments. Compared to other applications, the modified U-Net model 800 described in reference to FIG. 8 has a higher tolerance for latency. In an embodiment, an ensemble of two or more different backbone models can be used to increase performance along with producing uncertainty information. In the example embodiment shown, a simple averaging operation 904 is performed over the predictions output by three ML models 901-903. Note that ensemble ML models 901-903 work well for active learning tasks, particularly by providing uncertainty information. Uncertainty information can be used for the ML-assisted annotation cycle to pinpoint which map regions require hand annotation. In addition to providing robust uncertainty information. Ensemble ML models 901-903 also inherently provide better prediction. Although three ML models are shown in ensemble 900, ensemble 900 can include more or fewer ML models, where more ML models produce a finer-grained prediction.

The uncertainty information produced by the ensemble ML models 901-903 are more robust because the ensemble modeling 900 provides a more diverse range of predictions than a single model. Diversification of the predictions can be achieved by modifying each model's hyperparameters (e.g., depth parameters). In an embodiment, diversification is achieved by having different convolutional blocks in the modified U-Net model 800. The following FIGS. 10-12 show different U-Net model variants.

Figure 10:
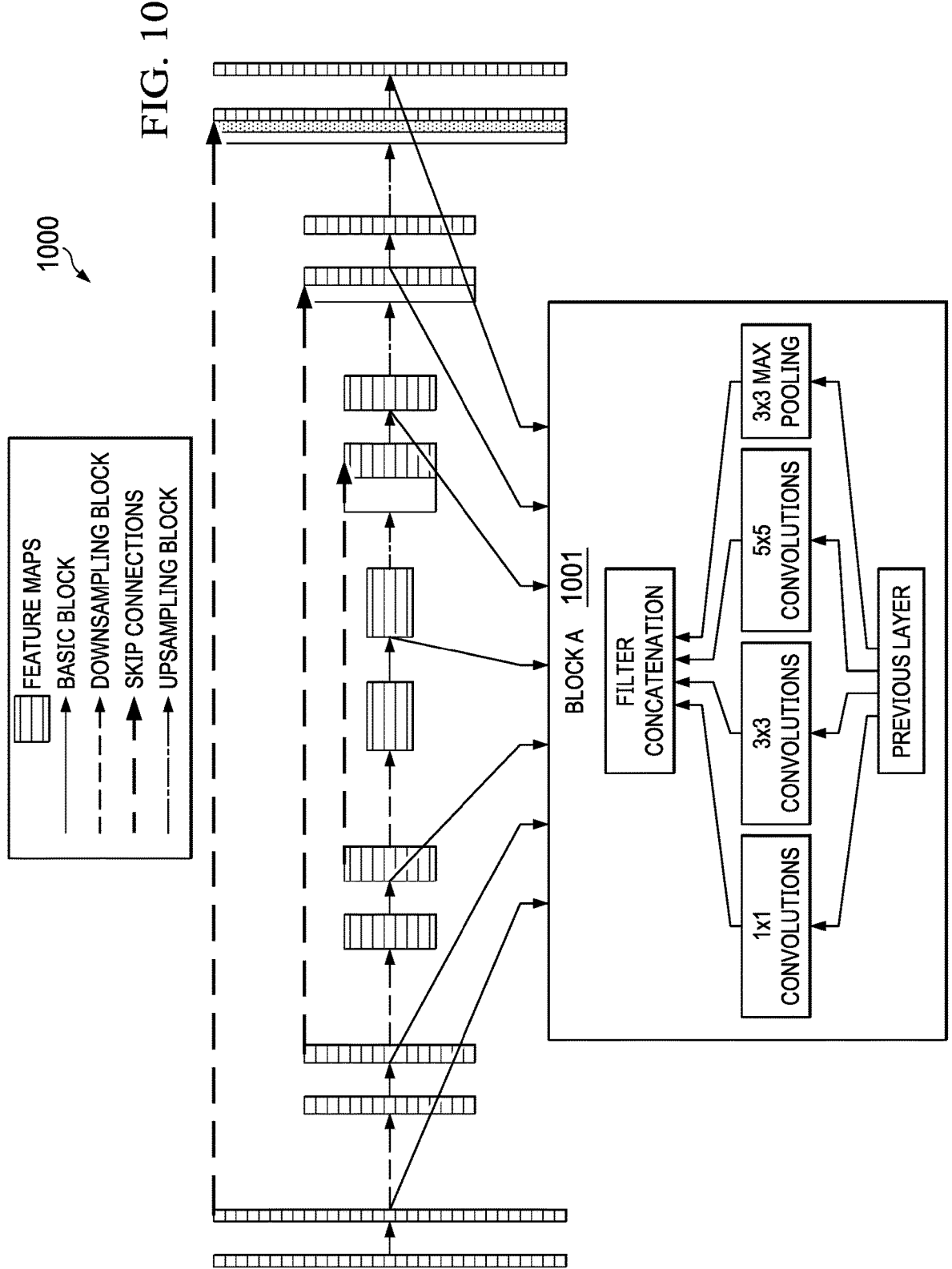
FIG. 10 is a conceptual diagram illustrating ensemble modeling for ML-based semantic map layer annotation using cascading blocks, in accordance with one or more embodiments.

FIG. 10 is a conceptual diagram illustrating ensemble modeling of 2D convolutional network 1000 for ML-based semantic map layer annotation using cascading convolutional blocks where one block variant 1001 (e.g., inception system 809) is used throughout the 2D convolutional network 1000, in accordance with one or more embodiments.

Figure 11:
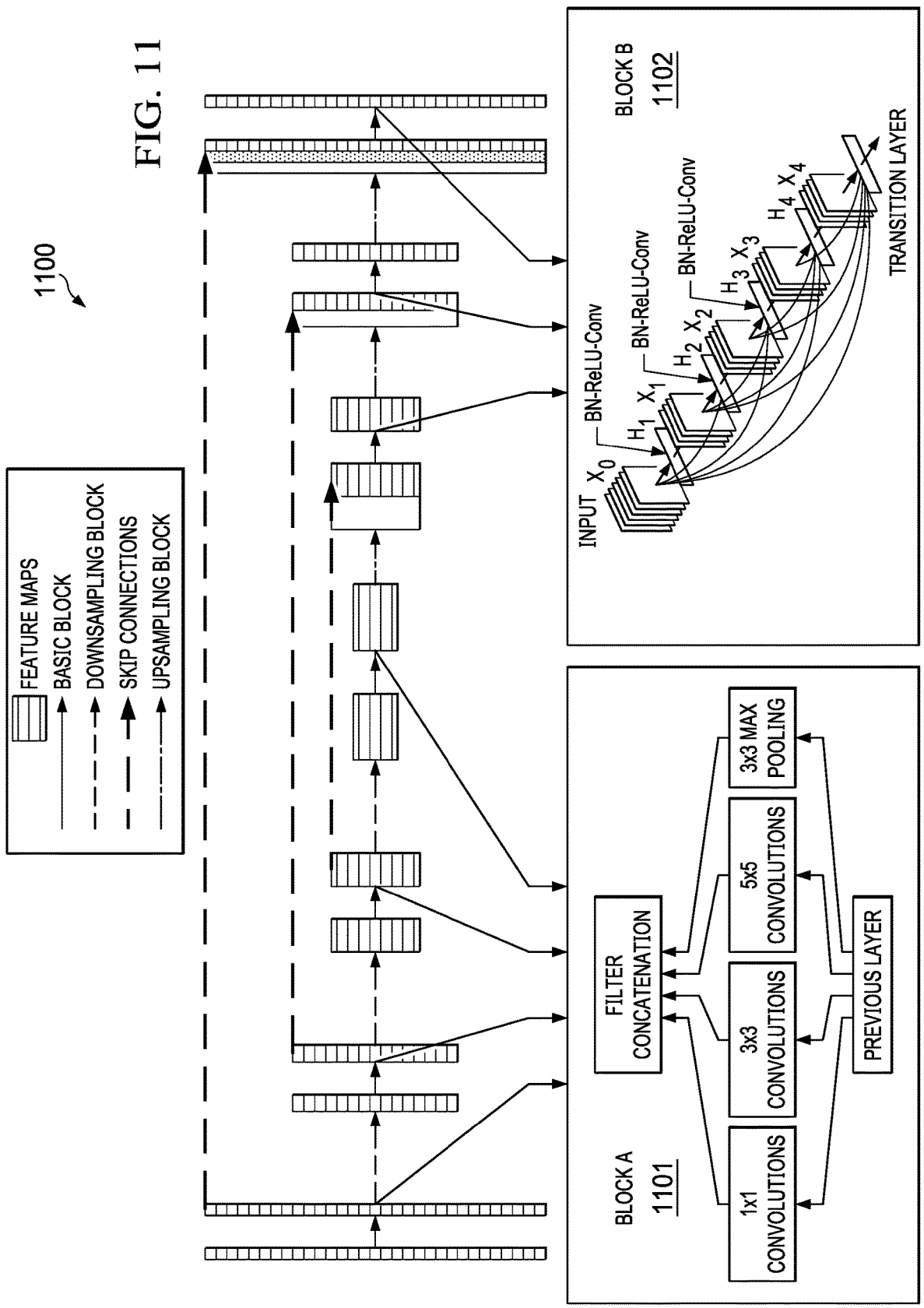
FIG. 11 is a conceptual diagram illustrating ensemble modeling for ML-based semantic may layer annotation showing different basic blocks for contractive and expansive paths, in accordance with one or more embodiments.

FIG. 11 is a conceptual diagram illustrating ensemble modeling of an 2D convolutional network 1100 for ML-based semantic may layer annotation showing different basic convolutional blocks 1101 (e.g., inception system 809), 1102 (e.g., dense block 811) for the contractive and expansive paths, respectively, in accordance with one or more embodiments.

Figure 12:
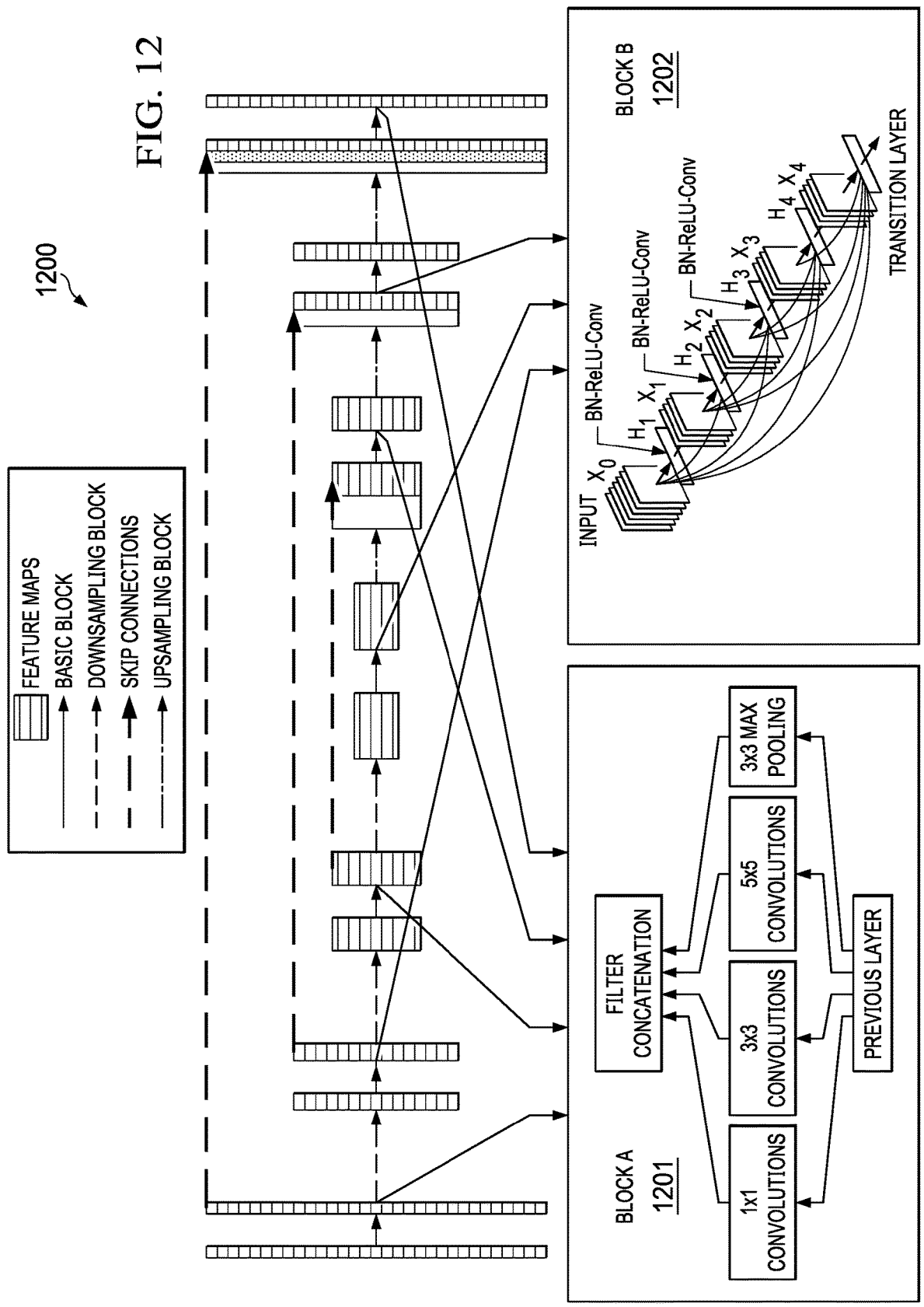
FIG. 12 is a conceptual diagram illustrating ensemble modeling for ML-based semantic may layer annotation showing alternating basic blocks, in accordance with one or more embodiments.

FIG. 12 is a conceptual diagram illustrating ensemble modeling and 2D convolutional network 1200 for ML-based semantic may layer annotation showing alternating basic blocks 1201 (e.g., inception system 809), 1202 (e.g., dense block 811), in accordance with one or more embodiments.

Figure 13:
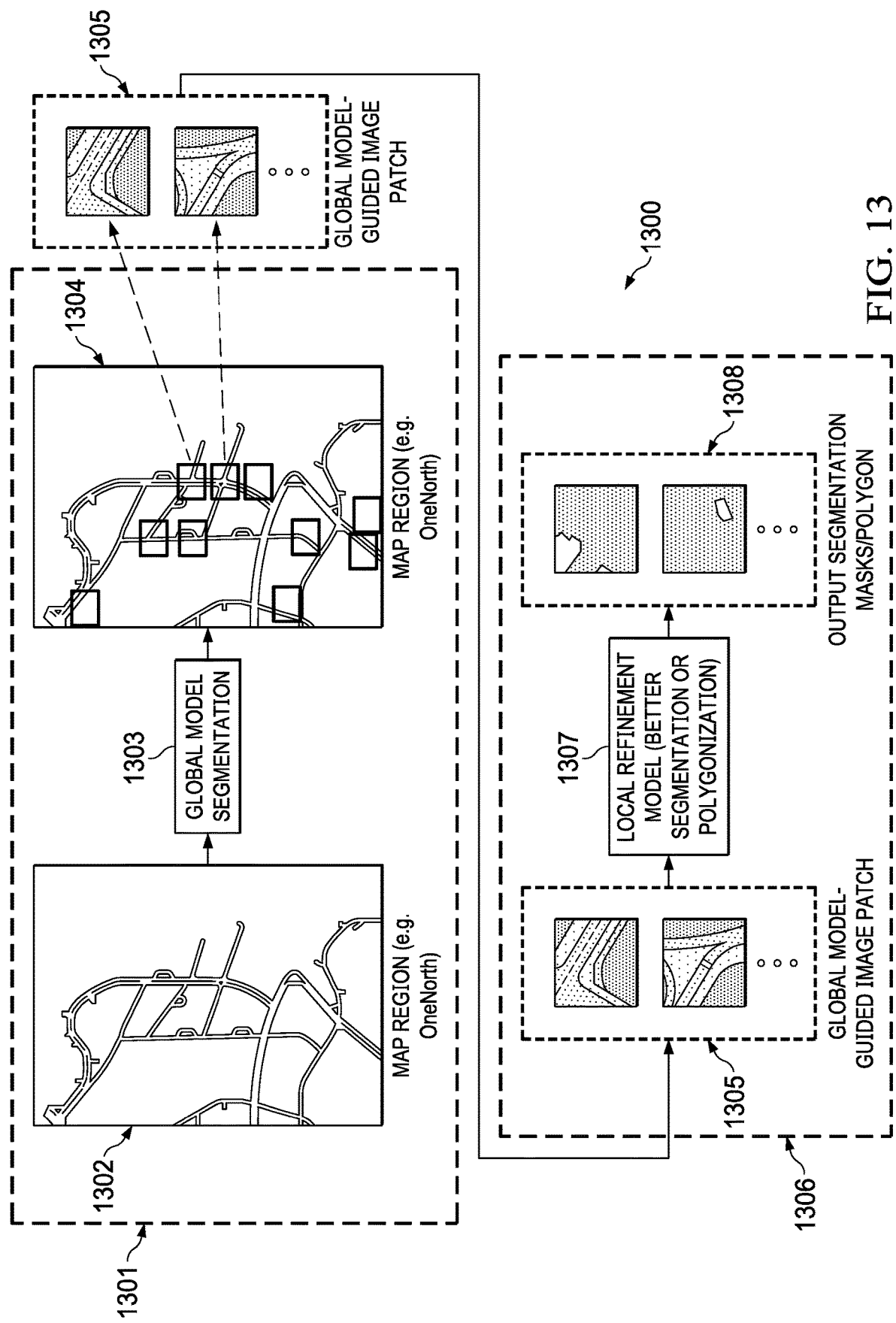
FIG. 13 is a conceptual diagram illustrating global to local model cascading, in accordance with one or more embodiments.

FIG. 13 is a conceptual diagram illustrating global to local model cascading, in accordance with one or more embodiments. Different from drivable area, intersections are an entirely different road landmark. They are typically scattered sparsely over a whole map region. Therefore, intersections need to be treated differently.

In an embodiment, an intersection detection pipeline 1300 is divided into two stages: a global detection stage 1301, followed by a local refinement stage 1302. In the global detection stage 1301, a global model 1303 (e.g., segmentation model) accepts as input a resized version of a map region 1302. The global model 1303 attempts to roughly pinpoint where a particular intersection is in the map region 1302. The output of the global model 1303 can be in the form of the map region 1304 with bounding boxes and/or segmentation masks. Map region 1304 serves as an initial cue on where human annotators should look for and refine intersections.

In the local refinement stage 1302, the local refinement system 1306 is a semantic segmentation model that accepts global model-guided cropped patches 1305 and tries to output a refined segmentation mask 1306 (e.g., a better segmentation model or polygonization) for the intersection. The local refinement model 1306 is trained to output segmentation masks 1307 with high-recall, i.e., it is assumed that the extracted patches 1305 from map region 1304 contain an intersection. The local refinement model 1306 predicts the segmentation mask 1307 with high localization accuracy.

Example Processes

Figure 14:
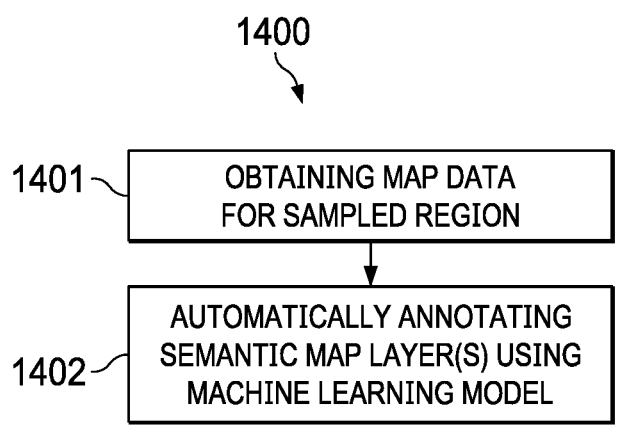
FIG. 14 is a flow diagram of a ML-based framework for drivable surface annotation, in accordance with one or more embodiments.

FIG. 14 is a flow diagram of a ML-based framework for drivable surface annotation, in accordance with one or more embodiments. Process 1400 can be implemented using, for example, computer system 300, as described in reference to FIG. 3.

Process 1400 includes the steps of obtaining map data for a geographic region (1401) and automatically annotating one or more semantic map layers using a machine learning model (1402). In an embodiment the map data is multimodal. In an embodiment, the multimodal map data includes one or more of intensity map, occupancy maps, LSN/2D convolutional network output, texture maps and any other suitable map data. In an embodiment, the map data is HD-map data. In an embodiment, the machine learning model predicts a drivable surface mask that includes category information (e.g., lanes, intersections, vehicle parking areas).

In an embodiment, the machine learning model is implemented by an image segmentation network based on a modified U-Net model with any segmentation-based loss function (e.g., a combination of cross entropy and dice loss). For example, the basic convolutional blocks in the contraction and expansion paths of the U-Net model can be replaced with residual blocks or dense blocks used in ResNet and DenseNet models, respectively.

In an embodiment, the modified U-Net model is iteratively trained on image samples extracted from one or more HD-map models, and different image samples are extracted from image regions for each training iteration to increase the variability of training images, and thus improve prediction.

In an embodiment, a tree data structure can be used to automatically split image regions of the map models into training and testing datasets using a tree data structure (e.g., using a Quadtree) to ensure an equal proportion of landmarks in the training and testing datasets.

After automated annotation, the ML-assisted annotated semantic map layers can be optionally further hand-annotated (1403).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
   obtaining, using at least one processor, map data for a vehicle; and
   automatically annotating, using the at least one processor, one or more semantic map layers of the map data using a machine learning model, wherein the machine learning model is trained on image samples extracted from one or more map models, and the one or more map models are split into different sampling image regions for generating a training dataset and a testing dataset, respectively.

2. The method of claim 1, wherein the map data is multimodal.

3. The method of claim 2, wherein the multimodal map data includes at least an intensity map and an occupancy map.

4. The method of claim 1, wherein the machine learning model is implemented by a two-dimensional (2D) convolutional network.

5. The method of claim 1, wherein the machine learning model is implemented using ensemble modeling.

6. The method of claim 1, wherein the machine learning model is iteratively trained on image samples extracted from one or more map models, and different image samples are extracted for each training iteration to increase variability of training images.

7. The method of claim 6, wherein the one or more map models are split into different sampling image regions for generating training and testing datasets for training and testing the machine learning model.

8. The method of claim 7, wherein the one or more map models are automatically split into different sampling image regions for generating training and testing datasets using a tree data structure.

9. The method of claim 8, wherein the one or more map models are automatically split into different sampling image regions based on a split criterion, the split criterion being when an instance of a particular road landmark is present more than once in a particular sampling image region.

10. The method of claim 8, wherein the tree data structure is a Quadtree data structure.

11. A system comprising:
at least one processor; and
a memory storing instructions thereon that, when executed by the at least one processor, cause the at least one processor to:
obtaining map data for a vehicle; and
automatically annotating one or more semantic map layers of the map data using a machine learning model, wherein the machine learning model is trained on image samples extracted from one or more map models, and the one or more map models are split into different sampling image regions for generating a training dataset and a testing dataset, respectively.

12. The system of claim 11, wherein the map data is localized.

13. The system of claim 11, wherein the map data is multimodal.

14. The system of claim 13, wherein the multimodal map data includes an intensity map and an occupancy map.

15. The system of claim 11, wherein the machine learning model is implemented by a two-dimensional (2D) convolutional network.

16. The system of claim 11, wherein the machine learning model is iteratively trained on image samples extracted from one or more map models, and different image samples are extracted for each training iteration to increase variability of training images.

17. The system of claim 16, wherein the one or more map models are split into different sampling image regions for generating training and testing datasets for training and testing the machine learning model.

18. The system of claim 17, wherein the one or more map models are automatically split into different sampling image regions for generating training and testing datasets using a tree data structure.

19. The system of claim 18, wherein the tree data structure is a Quadtree data structure.

20. A non-transitory, computer-readable storage medium having instructions stored thereon, that when executed by at least one processor, cause the at least one processor to perform operations, comprising:
obtaining map data for a vehicle; and
automatically annotating one or more semantic map layers of the map data using a machine learning model, wherein the machine learning model is iteratively trained on image samples extracted from one or more map models, different image samples are extracted for each training iteration, and the one or more map models are automatically split into different sampling image regions for generating a training dataset and a testing dataset, respectively, using a tree data structure.

* * * * *